United States Patent [19]

Hughes et al.

[11] 3,825,847

[45] July 23, 1974

[54] AMPLIFIER SYSTEM

[75] Inventors: David C. Hughes; Henry A. Sherwood, both of Short Hills, N.J.

[73] Assignee: Lorraine Industries, Inc., Bridgeport, Conn.

[22] Filed: Dec. 13, 1972

[21] Appl. No.: 314,718

Related U.S. Application Data

[63] Continuation of Ser. No. 95,466, Dec. 7, 1970.

[52] U.S. Cl. .................... 330/13, 330/28, 330/30 R, 330/51

[51] Int. Cl. .............................................. H03f 3/18

[58] Field of Search ............. 330/13, 17, 22, 25, 28, 330/30 R, 51, 85

[56] References Cited

UNITED STATES PATENTS

| | | | |
|---|---|---|---|
| 2,789,164 | 4/1957 | Stanley | 330/25 UX |
| 3,454,892 | 7/1969 | Knowles | 330/25 X |

OTHER PUBLICATIONS

Short, "Negative Feedback and Hum," Wireless World, March 1969, p. 116.

*Primary Examiner*—Herman Karl Saalbach
*Assistant Examiner*—James B. Mullins

[57] ABSTRACT

A cassette recorder amplifier system with a two stage preamplifier having direct current forward feed from the first to the second stage and direct current feedback from the second to the first stage to cause the second stage to operate without overloading as an input stage. The power amplifier has high direct current feedback and lower alternating current feedback for better linearity and more gain. Switch circuits and extra input terminals provide for recording on recording, aural monitoring of recording, and higher speed on fast forward and reverse.

3 Claims, 1 Drawing Figure

PATENTED JUL 2 3 1974 3,825,847
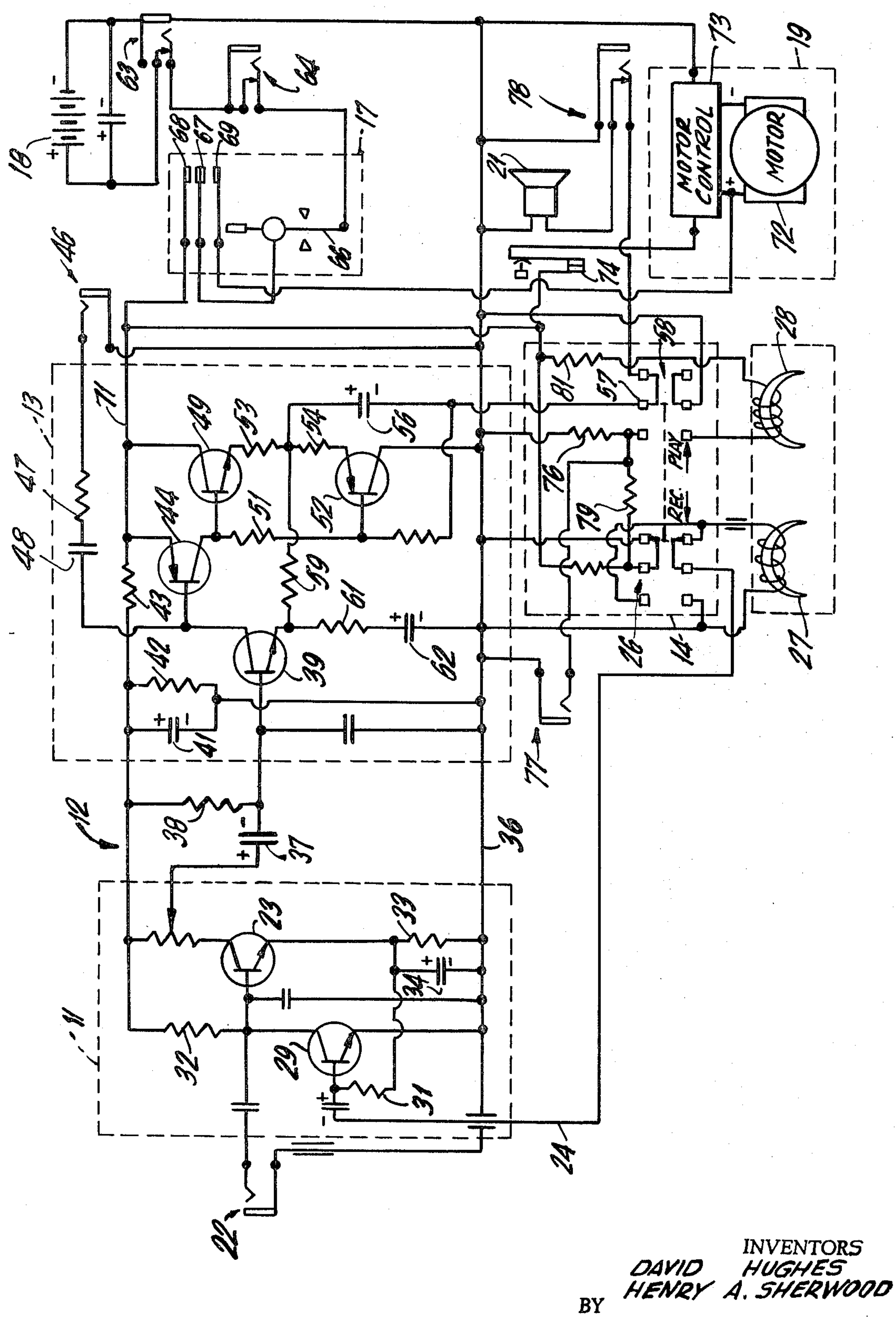
INVENTORS
DAVID HUGHES
HENRY A. SHERWOOD
BY
MARCH, LE FEVER & WYATT
ATTORNEYS

AMPLIFIER SYSTEM

This is a continuation of application Ser. No. 95,466, filed Dec. 7, 1970.

FIELD OF THE INVENTION

This invention relates to amplifier systems and particularly to amplifiers used in cassette tape recording and playback machines.

BACKGROUND OF THE INVENTION

Amplifiers for cassette recording and playback machines, which are usually referred to simply as cassette recorders, and particularly the small portable machines, are usually capable of performing only certain limited functions. In every instance, such machines include a pickup head, an amplifier, and a speaker to reproduce information recorded on magnetic tape. It is also common to provide auxiliary input and output terminals. Some of these machines are limited just to serving as playback units and are not capable of recording. The units that are capable of recording have a microphone input and switching means to operate the device either to reproduce sound or to record it on the tape. Sometimes an additional input terminal is provided. The same head is used for both recording and playback and is connected to the input section of the amplifier for playback purposes and to the output of the power amplifier for recording.

The market for cassette recorders is quite competitive and any cost advantage that may be derived from simplifying the construction is very important. Along with the advantage to be derived from simplifying the structure is a further commercial advantage that may be realized in making an inexpensive cassette recorder that has more versatility than instruments in the same price bracket. For example, the present invention achieves the equivalent of a relatively expensive automatic volume control by means of a simple circuit that also serves as an additional input circuit for the cassette recorder. A further auxiliary input may be included, at little cost, to make it possible to record the mixture of two signals at one time.

Existing cassette recorders may have visual indicators to provide some information as to the volume level of the signal being recorded, but these indicators are not available in machines that have automatic volume control. The present invention provides for an earphone monitor to determine the volume level at the recording head.

In the co-pending application Ser. No. 878,798 of David C. Hughes, an improved amplifier is described. This amplifier has certain circuit configurations similar to sections of the circuit of the present amplifier system. The present system, however, represents an improvement over the prior amplifier, especially in the provision of high gain for alternating current signals while maintaining good direct current stability. This is accomplished by providing a high degree of direct current feedback and a lesser degree of alternating current feedback in the power amplifier section.

The amplifier of the present invention also includes means to minimize the hum from operation from an alternating current source.

The motor controls of the present cassette recorder include means to turn off the motor entirely to reduce the noise when a cassette-like AM or FM tuner is inserted into the machine. The control circuit also includes means to provide faster operation of the motor in reverse and in the fast forward conditions.

The foregoing features represent only some of the objects of the present invention and further objects will be apparent hereinafter.

BRIEF DESCRIPTION OF THE INVENTION

The amplifier system of the present invention includes a pre-amplifier section with two transistors, one of which is connected to supply amplified signals to the other. Both of the transistors have separate input terminals connected to their respective bases and there is a direct current feedback circuit that includes an impedance connected in series with the emitter of the second transistor. The first transistor has an impedance connected from its base to the junction of the emitter of the second transistor and the impedance connected thereto. The output of the second transistor passes through a volume control to a power amplifier, the first stage of which has a well-filtered bias voltage supply. The output pair of transistors has an impedance connected back to the emitter of the first stage of the power amplifier to provide 100 percent direct current feedback. An additional, and smaller, resistor is connected in series with a capacitor between the emitter of the first stage of the power amplifier and the common terminal, or ground. This circuit provides less than 100 percent feedback for alternating current and thus greater gain for the alternating current.

The circuit also includes switches to turn off the motor of the cassette recorder when desired and to connect a recording and playback head and an erase head to the amplifier as required for either playback or recording of information on magnetic tape.

DETAILED DESCRIPTION OF THE INVENTION

The only drawing is a schematic diagram of an amplifier system constructed according to the invention primarily for use in a cassette recorder or the like.

The amplifier system includes a pre-amplifier stage 11, the output of which is connected through a volume control 12 to a power amplifier 13. A switch section 14 connects a tape head section 16 either to the input of the pre-amplifier 11 or the output of the power amplifier 13, depending upon whether playback or recording is desired. Part of the switching is carried out by a cam switch 17 which is described and claimed in the co-pending application Ser. No. 95,567 of Henry A. Sherwood, entitled CASSETTE RECORDER, filed Dec. 7, 1970. A battery 18 provides all of the power necessary to run the amplifier as well as a motor and control circuit 19. Normally audio output of the system when used for playback purposes is from a loudspeaker 21.

To consider the circuit in greater detail, the pre-amplifier 11 has a fixed input terminal 22 in the form of a jack into which a microphone may be plugged. One side of this terminal is grounded over a capacitor and the other side is connected to the base of a transistor 23. The pre-amplifier 11 has a second input terminal 24 which is connected through a double-pole-double through switch 26 to a recording and playback head 27. The latter is one of the two heads in the head section 16, the other being an erase head 28.

The input terminal 24 is connected to the base of a transistor 29, and a resistor 31 of about 47 K connects this base to the emitter of the transistor 23. Another resistor 32 forms the output load of the transistor 29. Signals amplified by the transistor 29 are then amplified by the transistor 23, and therefore, the transistor 29 may appropriately be considered the first transistor, or first stage, and the transistor 23, the second transistor, or second stage, of the pre-amplifier 11. An impedance comprising a resistor 33 in parallel with a capacitor 34 having a relatively large capacitance is connected between the common terminal 36 and the junction of the emitter of the transistor 23 and one end of the resistor 31.

The collector load of the second transistor 23 is a potentiometer 38 that forms the volume control 12 for the circuit. The arm of the volume control is connected through a capacitor 37 to the base of a transistor 39 that forms the first stage of the power amplifier 13. In order to be sure that any alternating current hum that might be present is not amplified by the amplifier 13, the bias voltage for the base of the transistor 39 is filtered by a circuit comprising a large capacitor 41 in parallel with a resistor 42, both connected in series with another resistor 43.

The output of the transistor 39 is connected to the base of the second transistor stage 44. An auxiliary input terminal 46 is also connected, by way of a series resistor 47 and a series capacitor 48, to the base of the transistor 44. The output at the collector of the transistor 44 is connected directly to the base of one of the power amplifier transistors 49 and, by way of a small resistor 51, to the base of the other power amplifier transistor 52. The emitters of the two transistors 49 and 52 are connected together by small resistors 53 and 54 of the order of 1 ohm. The common junction between these two resistors is connected by way of a large output capacitor 56 to an output terminal 57 which is one of the arms of a double-pole-double-throw switch 58. The output signal from the junction between the resistors 53 and 54 is also connected through a resistor 59, which may have a resistance of the order of 22 ohms, to the emitter of the first amplifier transistor 39 in the power amplifier 13. This provides 100 percent direct current feedback from the output to the input of the power amplifier. A small resistor 61 which may have, for example, 22 ohms, is connected in series with a relatively large capacitor 62 between the emitter of the transistor 39 and the common terminal 36. The battery 18 is connected in series with a jack 63 that may disconnect the battery and substitute an external power source. A second jack 64 may be used to provide remote on-off switching of the amplifier system, as desired. These jacks are connected in series with a cam-operated switch 17 that has a handle 66 and means to connect the jack 64 to a movable terminal 67 to be connected to either one of two fixed terminals 68 or 69. The terminal 68 is connected to the positive supply line 71 of the amplifier system and the terminal 69 is connected directly to one of the terminals of a motor 72 in the motor section 19.

Normally the motor is controlled by a control circuit 73 which receives operating current by way of a single-pole-single-throw normally closed switch 74. This switch may be opened if a cassette-like AM or FM tuner is inserted into the receptacle for tape cassettes in the machine.

The switching network 14 comprises the two double-pole-double-throw switches 26 and 58 and means including a relatively low resistance resistor 76 which would be connected across the output of the power amplifier 13 in the recording position. A monitor jack 77 is connected across this resistor 76 to provide audible monitoring of the sound being recorded by the recording and playback head 27. When the switches 26 and 58 are in the playback position, which is the position shown, one end of the coil of the playback head 27 is directly connected to the input terminal 24 and the erase head 28 is not energized at all. However, the arm 57 of the switch 58 is connected to the speaker 21 and to a jack 78 to which an earphone may be connected in such a way as to disengage the speaker 21. The motor 72 energized through the motor control circuit 73 unless the switch 74 is opened to eliminate motor noise when an AM or FM tuner is used.

When the switches 26 and 58 are thrown to the recording position, the recording and playback head 27 is connected through a resistor 79 and the arm 57 to the output of the power amplifier 13. The erase head 28 is connected in series with a resistor 81. The input terminal 24 is connected directly to the common terminal 36 by way of the switch 26 and, as a result, the direct current operating level for the base of the second transistor 23, which is determined by the direct current feedback from the emitter of the transistor 23 through the resistor 31 to the base of the first transistor 29, is held in a proper operating range to avoid any undue saturation or cutoff of signals applied to the input terminal 22. This is effectively the same as automatic volume control to maintain a proper level of signal applied to the recording head 27.

Because the auxiliary input terminal 46 is entirely separate from the microphone terminal 22, a second signal source, such as a separate amplifier, may be used to provide an additional signal to be mixed with the signal from the microphone and recorded on the tape. This is commonly known as "recording on recording" and is normally a feature available only in relatively expensive equipment. By leaving the microphone input terminal 22 connected permanently to the second transistor 23, the amplifier system can be used as a public address amplifier or an amplifier for an electric guitar.

Normally when it is desired to move the tape rapidly either forward or backward, the speed is still controlled by a motor control circuit. However, in accordance with the present invention, the cam switch provides means for bypassing the motor control circuit 73 and connecting the motor 72 directly to the battery 18 so as to receive full battery voltage and thus run faster.

The invention has been described in connection with one example for illustrative purposes. This example, however, is not to be considered as a limitation for variations and modifications may be made to the invention without departing from the spirit thereof as set forth in the claims.

What is claimed is:

1. An amplifier system comprising:

a first transistor;

a first signal input terminal connected to the base of said first transistor;

a second transistor;

a first direct current connection from the collector of said first transistor to the base of said second transistor to supply amplified signals from said first transistor to said second transistor;

a direct current feedback connection from the emitter of said second transistor to the base of said first transistor;

a second signal input terminal connected to the base of said second transistor;

a biasing impedance connected to said feedback circuit to have a voltage produced thereacross to maintain the operation of said second transistor in a predetermined portion of its operating range to prevent distortion of signals by said second transistor, a common terminal; and switch means effectively to short-circuit said first input terminal to said common terminal to assist in stabilizing the operation of said second transistor.

2. An amplifier system comprising:

a first transistor;

a first signal input terminal connected to the base of said first transistor;

a second transistor;

a first direct current connection from the collector of said first transistor to the base of said second transistor to supply amplified signals from said first transistor to said second transistor;

a direct current feedback connection from the emitter of said second transistor to the base of said first transistor;

a second signal input terminal connected to the base of said second transistor;

a biasing impedance connected to said feedback circuit to have a voltage produced thereacross to maintain the operation of said second transistor in a predetermined portion of its operating range to prevent distortion of signals by said second transistor;

a first transistor amplifier stage connected to the output electrode of said second transistor;

a pair of complementary power transistors connected in series with their emitters connected to a common junction;

a common terminal; and direct current and alternating current feedback means connecting said junction to said first transistor amplifier stage and providing a higher percentage of direct current feedback than alternating current feedback to stabilize the direct current operation of said power amplifier and to provide higher alternating current gain.

3. The amplifier of claim 2 comprising, in addition, an intermediate transistor stage comprising:

A. A first input terminal connected to the output of the said first transistor amplifier stage; and B. An auxiliary input terminal to receive, simultaneously, separate signals to mix with signals received from said second signal input terminal.

* * * * *